United States Patent Office 2,719,172
Patented Sept. 27, 1955

2,719,172

NITRIC ACID OXIDATION TO DICARBOXYLIC ACIDS

Erich Nebe, Heidelberg, and Otto Boehm, Ludwigshafen (Rhine), Germany, assignors to Badische Anilin- & Soda-Fabrik Aktiengesellschaft, Ludwigshafen (Rhine), Germany No Drawing. Application August 30, 1952, Serial No. 307,396

Claims priority, application Germany September 3, 1951

7 Claims. (Cl. 260—531)

This invention relates to improvements in working up the reaction mixture formed by the oxidation of aliphatic and cycloaliphatic compounds with nitric acid to form dicarboxylic acids.

In the oxidation of aliphatic and cycloaliphatic compounds containing carbonyl, hydroxyl or amino groups, such as hexanediol (1,6), cyclohexanol, cyclohexanone, cyclohexylamine or caprolactam with nitric acid there are obtained not only dicarboxylic acids having the same length of carbon chain as the initial material, but also, by reason of further oxidation, dicarboxylic acids of shorter chain length and furthermore more or less large amounts of nitro compounds. Thus for example in the oxidation of cyclohexanol with nitric acid there are formed, in addition to the desired adipic acid, also glutaric acid, succinic acid and oxalic acid as well as compounds containing nitro groups. These by-products are more readily soluble than the adipic acid and therefore remain dissolved in the mother liquor when the adipic acid is separated by cooling and centrifuging the oxidation mixture.

The mother liquor is usually concentrated under reduced pressure until the concentration of nitric acid has reached the most suitable value for the oxidation of fresh amounts of initial material, and employed again after the addition of fresh nitric acid. In this way the by-products finally become so enriched in the oxidation mixture that they impair the purity of the adipic acid precipitated. It is therefore necessary to withdraw large amounts of mother liquor from circulation, continuously or from time to time, and to work them up separately. When these liquors are concentrated under reduced pressure, there first separates, besides residual adipic acid, mainly oxalic acid and succinic acid. Their purification and in particular the working up of the residual liquor is, however, very difficult according to the usual methods, so that hitherto they were usually lost.

We have now found that the reaction mixtures obtained in the oxidation of aliphatic and cycloaliphatic compounds with nitric acid to form dicarboxylic acids can be worked up in a simple manner by evaporating them to dryness under reduced pressure, preferably after the separation of the products precipitated by cooling and concentration, and then heating the residue at 100° C. to 200° C. until the splitting off of oxides of nitrogen has ended. In this way there are formed masses which are usually brown in colour and from which by crystallisation with an addition of decolourising agents or by distillation pure dicarboxylic acids of lower chain length are recovered.

The process is especially suitable for working up the reaction mixture obtained by the oxidation of cyclohexanol with nitric acid. From this reaction mixture, after separating the adipic acid which crystallises out upon cooling, concentrating the filtrate under reduced pressure and again cooling, there first separate crystals consisting mainly of oxalic acid, succinic acid and small amounts of adipic acid.

By complete evaporation under reduced pressure and subsequent heating at atmospheric pressure at 100° C. to 200° C. with the evolution of oxides of nitrogen and carbon dioxide, there is obtained from the residual liquor a residue from which glutaric acid is obtained by distillation at greatly reduced pressure.

The process is also applicable in analogous manner to reaction mixture obtained for example by the oxidation of cyclohexylamine, cyclohexanone, cyclopentanol, cycloheptanol, caprolactam, $\omega.\omega'$- dihydroxydialkyl ethers or distillation residues of such compounds.

The following examples will further illustrate this invention but the invention is not limited to these examples. The parts are by weight.

Example 1

5500 parts of the mother liquor remaining after separating the bulk of the adipic acid from a reaction mixture from the oxidation of cyclohexanol with nitric acid are concentrated to about 1200 parts under a pressure of 20 Torr. at 50° to 60° C. The crystal pulp precipitated by cooling to 15° C. is filtered off by suction and is then suspended in 700 parts of fresh mother liquor and again filtered by suction. By recrystallisation from water it yields 426 parts of a mixture of oxalic acid and succinic acid. The combined filtrates are further evaporated under a pressure of 20 Torr. until the temperature of the residue has risen to about 70° C. The residue is then gradually heated to 170° C. under atmospheric pressure. The splitting off of oxides of nitrogen and carbon dioxide is completed after about 3 hours. The remaining brown crystalline mass (538 parts) is distilled at a pressure of 1 Torr. and thereby yields 450 parts of practically pure glutaric acid. The nitric acid recovered by concentrating the mother liquor and the filtrate from the oxalic and succinic acids can be used again for the oxidation of further cyclohexanol.

Example 2

7000 parts of the mother liquor employed as initial material in Example 1 are evaporated under a pressure of 20 Torr. until the temperature of the residue has risen to about 70° C. 1300 parts of a yellow-brown residue remain which is gradually heated to 170° C. at atmospheric pressure. When oxides of nitrogen are no longer evolved, the residue is heated for another hour at 170° C. to 275° C. 1033 parts of a dark brown mass remain from which 870 parts of a pale coloured dicarboxylic acid mixture having the saponification number 822 are obtained by steam distillation under reduced pressure. It is directly suitable for esterification with monohydric or polyhydric alcohols, whereby valuable softeners or binding agents for linoleum and the like are formed.

Similar dicarboxylic acid mixtures are obtained if the mother liquors of the oxidation of cyclohexylamine or of cyclohexanone or caprolactam with nitric acid are used as the starting materials.

Example 3

1000 parts of a mother liquor originating from the oxidation of hexanediol-(1.6) with 60 per cent nitric acid after separation of the adipic acid precipitated by cooling to about 15° C., are concentrated under a pressure of 15 Torr. until the temperature in the sump has risen to 70° C. and almost all the nitric acid has been removed. The residue (173 parts) is gradually heated at atmospheric pressure until the temperature has risen to about 160° C. and the evolution of oxides of nitrogen, which is originally vigorous, has entirely ceased. 138 parts of a residue are obtained which after purification by a steam distillation under reduced pressure yields 114 parts of a mixture of dicarboxylic acids having the saponification number 788.

What we claim is:

1. A process for working up the mother liquors obtained by the oxidation of aliphatic and cyclic compounds containing a chain of six carbon atoms and selected from the group consisting of hexanediol-(1,6), cyclohexanone, cyclohexanol, caprolactam and cyclohexylamine by means of aqueous nitric acid and separating the dicarboxylic acids formed by concentrating and cooling, which process comprises evaporating said mother liquors to dryness under reduced pressure at temperatures up to 70° C., heating the residue at about 100° C. to 200° C. until no more nitrogen oxides are split off and distilling it by means of steam under reduced pressure until no more dicarboxylic acids distil over.

2. A process for working up the mother liquors obtained by the oxidation of hexanediol-(1,6) with 60 per cent aqueous nitric acid, cooling the reaction mixture to about 15° C. and separating the precipitated dicarboxylic acids, which process comprises evaporating said mother liquors under reduced pressure at temperatures up to about 70° C., heating the residue at atmospheric pressure to about 160° C. to 170° C. until no more nitrogen oxides are split off and distilling it by means of steam under reduced pressure until no more dicarboxylic acids distil over.

3. A process for working up the mother liquors obtained by oxidizing cyclohexanol with aqueous nitric acid, separating the bulk of adipic acid formed, concentrating the remaining solution under reduced pressure at about 50° C. to 60° C. and separating the mixture of further dicarboxylic acids precipitated by cooling at about 15° C., which process comprises evaporating said mother liquors under reduced pressure at temperatures up to about 70° C., heating the residue at atmospheric pressure to about 170° C. until no more nitrogen oxides are split off and distilling the crystalline mass obtained by means of steam under reduced pressure until no more glutaric acid distils over.

4. A process for working up the mother liquors obtained by oxidizing cyclohexanol with aqueous nitric acid, and separating the bulk of adipic acid formed, which process comprises evaporating said mother liquors under reduced pressure at temperatures up to about 70° C., heating the residue at atmospheric pressure to about 170° C. until no more nitrogen oxides are split off and distilling the crystalline mass obtained by means of steam under reduced pressure until no more dicarboxylic acids distil over.

5. A process for working up the mother liquors obtained by oxidizing cyclohexanone with aqueous nitric acid and separating the bulk of adipic acid formed, which process comprises evaporating said mother liquors under reduced pressure at temperatures up to about 70° C., heating the residue at atmospheric pressure to about 170° C. until no more nitrogen oxides are split off and distilling the crystalline mass obtained by means of steam under reduced pressure until no more dicarboxylic acids distil over.

6. A process for working up the mother liquors obtained by oxidizing cyclohexylamine with aqueous nitric acid and separating the bulk of adipic acid formed, which process comprises evaporating said mother liquors under reduced pressure at temperatures up to about 70° C., heating the residue at atmospheric pressure to about 170° C. until no more nitrogen oxides are split off and distilling the crystalline mass obtained by means of steam under reduced pressure until no more dicarboxylic acids distil over.

7. A process for working up the mother liquors obtained by oxidizing caprolactam with aqueous nitric acid and separating the bulk of adipic acid formed, which process comprises evaporating said mother liquors under reduced pressure at temperatures up to about 70° C., heating the residue at atmospheric pressure to about 170° C. until no more nitrogen oxides are split off and distilling the crystalline mass obtained by means of steam under reduced pressure until no more dicarboxylic acids distil over.

References Cited in the file of this patent

UNITED STATES PATENTS

| Number | Name | Date |
|---|---|---|
| 2,285,601 | McAllister | June 9, 1942 |
| 2,298,387 | Kenyon et al. | Oct. 13, 1942 |
| 2,343,534 | Cavanaugh et al. | Mar. 7, 1944 |
| 2,465,984 | Doumani et al. | Mar. 29, 1949 |